United States Patent
Manku

(10) Patent No.: US 9,197,279 B2
(45) Date of Patent: Nov. 24, 2015

(54) ESTIMATION AND REDUCTION OF SECOND ORDER DISTORTION IN REAL TIME

(71) Applicant: RESEARCH IN MOTION LIMITED, Waterloo (CA)

(72) Inventor: Tajinder Manku, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 182 days.

(21) Appl. No.: 13/832,313

(22) Filed: Mar. 15, 2013

(65) Prior Publication Data

US 2014/0273889 A1    Sep. 18, 2014

(51) Int. Cl.
*H04B 17/00* (2015.01)
*H04B 1/44* (2006.01)
*H04B 1/30* (2006.01)
*H04B 17/21* (2015.01)

(52) U.S. Cl.
CPC .. *H04B 1/44* (2013.01); *H04B 1/30* (2013.01); *H04B 17/21* (2015.01)

(58) Field of Classification Search
CPC ...... H04B 1/109; H04B 1/30; H04B 17/0062; H04B 15/00; H04B 17/0085; H04B 1/16; H04L 25/0272; H04L 25/0294; H04L 25/0296; H04L 27/2647; H04L 27/38; H04L 27/3863
USPC ......... 327/113, 122, 565, 355, 358, 359, 389, 327/390, 407, 427, 534; 330/149, 295, 302, 330/301, 254, 253, 285, 296; 375/130, 224, 375/259, 316, 318, 346, 343; 455/295, 455/127.1, 343.1, 130, 131, 196.1, 20, 208, 455/209, 226.1, 226.2, 285, 293, 296
See application file for complete search history.

(56) References Cited

U.S. PATENT DOCUMENTS

| | | |
|---|---|---|
| 5,726,597 A | 3/1998 | Petty et al. |
| 5,749,051 A | 5/1998 | Dent |
| 6,242,963 B1 | 6/2001 | Su et al. |
| 6,590,438 B1 | 7/2003 | Manku et al. |

(Continued)

OTHER PUBLICATIONS

IQ Imbalance Compensation in OFDMA based WiMAX Digital Receivers Wang Lilei; Xu Huimin, Computer Science and Information Technology, 2008. ICCSIT apos;08. International Conference on Volume, Issue, Aug. 29, 2008-Sep. 2 2008 pp. 388-392.

(Continued)

*Primary Examiner* — Golam Sorowar
(74) *Attorney, Agent, or Firm* — Jeffrey N. Giunta; Fleit Gibbons Gutman Bongini & Bianco P.L.

(57) ABSTRACT

A radio receiver method of reducing second order distortion components involves at a first mixer, mixing an input signal with an oscillator signal to generate an I component of a received radio communication signal; at a second mixer, mixing the input signal with a phase shifted oscillator signal to generate a Q component of the received radio communication signal; computing an estimate of second order distortion as a function of the I and Q components of the received radio communication signal; and adjusting an operational parameter of the radio receiver to reduce the estimated value of second order distortion components. This abstract is not to be considered limiting, since other embodiments may deviate from the features described in this abstract.

20 Claims, 3 Drawing Sheets

(56) References Cited

U.S. PATENT DOCUMENTS

| | | | |
|---|---|---|---|
| 6,639,446 B2 | 10/2003 | Komurasaki et al. |
| 6,859,085 B2 | 2/2005 | Watanabe et al. |
| 6,941,121 B2 | 9/2005 | Chen |
| 7,006,447 B1 | 2/2006 | Vaisanen et al. |
| 7,020,468 B2 | 3/2006 | Squibbs et al. |
| 7,164,901 B2 | 1/2007 | Zheng et al. |
| 7,171,185 B2 | 1/2007 | Matsumoto et al. |
| 7,203,476 B2 | 4/2007 | Ruelke et al. |
| 7,218,163 B2 | 5/2007 | Hanke et al. |
| 7,242,910 B2 | 7/2007 | Peterson, III et al. |
| 7,251,468 B2 | 7/2007 | Ruelke et al. |
| 7,259,569 B2 | 8/2007 | Kim |
| 7,292,836 B2 | 11/2007 | Endress et al. |
| 7,346,134 B2 | 3/2008 | Smith |
| 7,346,313 B2 | 3/2008 | Cafarella |
| 7,369,837 B2 | 5/2008 | Kim |
| 7,415,253 B2 | 8/2008 | Carter et al. |
| 7,421,260 B2 | 9/2008 | Darabi |
| 7,421,263 B2 | 9/2008 | Kim |
| 7,440,742 B1 | 10/2008 | Tsai et al. |
| 7,447,490 B2 | 11/2008 | Kuo et al. |
| 7,450,918 B2 | 11/2008 | Park |
| 7,457,606 B2 | 11/2008 | Kim |
| 7,477,888 B2 | 1/2009 | Behzad |
| 7,496,340 B1 | 2/2009 | Chen et al. |
| 7,496,343 B2 | 2/2009 | Khorram |
| 7,509,112 B2 | 3/2009 | Fujii |
| 7,519,348 B2 | 4/2009 | Shah |
| 7,522,899 B1 | 4/2009 | He |
| 7,532,563 B1 | 5/2009 | Shirali et al. |
| 7,532,874 B2 | 5/2009 | Muhammad et al. |
| 7,542,100 B2 | 6/2009 | Yee et al. |
| 7,542,751 B2 | 6/2009 | Chiu et al. |
| 7,551,695 B2 | 6/2009 | Speth |
| 7,554,380 B2 | 6/2009 | Embabi et al. |
| 7,567,611 B2 | 7/2009 | Chien |
| 7,570,965 B2 | 8/2009 | Rofougaran |
| 7,773,967 B2 | 8/2010 | Smith |
| 7,787,853 B2 | 8/2010 | Belot et al. |
| 7,869,777 B2 | 1/2011 | Darabi |
| 7,873,367 B2 | 1/2011 | Malik et al. |
| 7,890,078 B2 | 2/2011 | Kluge et al. |
| 7,929,938 B2 | 4/2011 | Sellars et al. |
| 7,945,230 B2 | 5/2011 | Tillman |
| 7,949,313 B2 | 5/2011 | Ridgers et al. |
| 7,965,796 B2 | 6/2011 | Kutz et al. |
| 8,000,676 B2 | 8/2011 | Kim et al. |
| 8,010,077 B2 | 8/2011 | Ivonnet et al. |
| 8,045,943 B2 | 10/2011 | Kaczman et al. |
| 8,060,043 B2 | 11/2011 | Pratt et al. |
| 8,073,078 B2 | 12/2011 | Kaczman et al. |
| 8,107,368 B2 | 1/2012 | Connors et al. |
| 8,112,055 B2 | 2/2012 | Yang et al. |
| 8,112,059 B2 | 2/2012 | Beffa |
| 8,121,571 B2 | 2/2012 | Kushnir et al. |
| 8,149,902 B1 | 4/2012 | Mohindra |
| 8,149,955 B2 | 4/2012 | Tired |
| 8,150,350 B2 | 4/2012 | Pratt et al. |
| 8,150,360 B2 | 4/2012 | Ivonnet et al. |
| 2002/0197975 A1 | 12/2002 | Chen |
| 2003/0143967 A1 | 7/2003 | Ciccarelli et al. |
| 2004/0152435 A1 | 8/2004 | Pellat et al. |
| 2004/0259519 A1 | 12/2004 | Su |
| 2005/0110567 A1 | 5/2005 | Rabinovich et al. |
| 2005/0130619 A1 | 6/2005 | Hanke et al. |
| 2005/0143044 A1 | 6/2005 | Kim |
| 2005/0232377 A1 | 10/2005 | Kutz et al. |
| 2005/0239430 A1 | 10/2005 | Shah |
| 2006/0014515 A1 | 1/2006 | Ruelke et al. |
| 2006/0094361 A1 | 5/2006 | Darabi |
| 2007/0126491 A1 | 6/2007 | Woo et al. |
| 2008/0116902 A1 | 5/2008 | Kim et al. |
| 2009/0004983 A1 | 1/2009 | Darabi |
| 2009/0068974 A1 | 3/2009 | Smith |
| 2009/0143031 A1 | 6/2009 | Shah |
| 2009/0202022 A1 | 8/2009 | Kaczman et al. |
| 2009/0239495 A1 | 9/2009 | Sellars et al. |
| 2009/0280767 A1 | 11/2009 | Tillman |
| 2009/0325529 A1 | 12/2009 | Yang et al. |
| 2010/0093298 A1 | 4/2010 | Pratt et al. |
| 2010/0120369 A1 | 5/2010 | Ko et al. |
| 2010/0167683 A1 | 7/2010 | McMullin et al. |
| 2011/0065412 A1 | 3/2011 | Beffa |
| 2011/0092178 A1 | 4/2011 | Wang |
| 2011/0128992 A1 | 6/2011 | Maeda et al. |
| 2011/0151792 A1 | 6/2011 | Kushnir et al. |
| 2011/0195673 A1 | 8/2011 | Pratt et al. |
| 2011/0201296 A1* | 8/2011 | Kaczman et al. ............. 455/326 |
| 2011/0230157 A1 | 9/2011 | Zhou et al. |
| 2011/0299575 A1 | 12/2011 | Aoulad Ali et al. |
| 2012/0002770 A1 | 1/2012 | Morita et al. |
| 2012/0015616 A1* | 1/2012 | Pratt et al. .................... 455/209 |
| 2012/0077453 A1* | 3/2012 | Ahrari et al. .................. 455/341 |
| 2012/0088532 A1 | 4/2012 | Thomas et al. |
| 2012/0238232 A1 | 9/2012 | Murphy et al. |
| 2012/0252374 A1 | 10/2012 | Mattisson et al. |
| 2012/0300818 A1* | 11/2012 | Metreaud et al. ............. 375/219 |
| 2013/0029626 A1 | 1/2013 | Chen et al. |
| 2013/0157604 A1* | 6/2013 | Jantzi et al. ................... 455/296 |
| 2013/0231124 A1 | 9/2013 | Vrzic et al. |
| 2014/0162628 A1 | 6/2014 | Bevelacqua et al. |

OTHER PUBLICATIONS

P. Rykaczewski, "Non-data-aided IQ imbalance compensation using measured receiver front-end signals", the 17th Annual IEEE Int. Sym on Personal, Indoor and Mobile Radio Com., 2006.

European Search Report, EP13159313.9, Jul. 19, 2013.

* cited by examiner

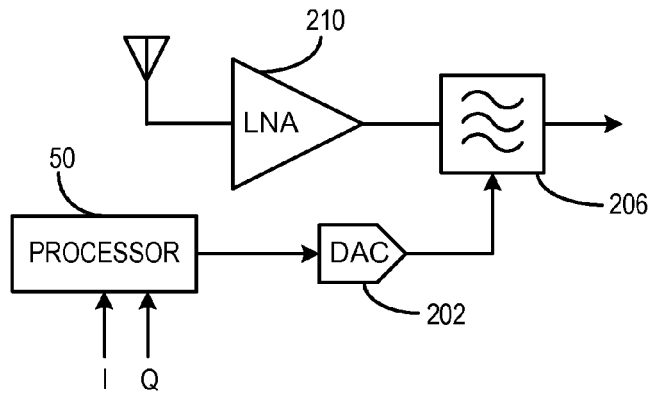
*FIG. 3*
*FIG. 4*
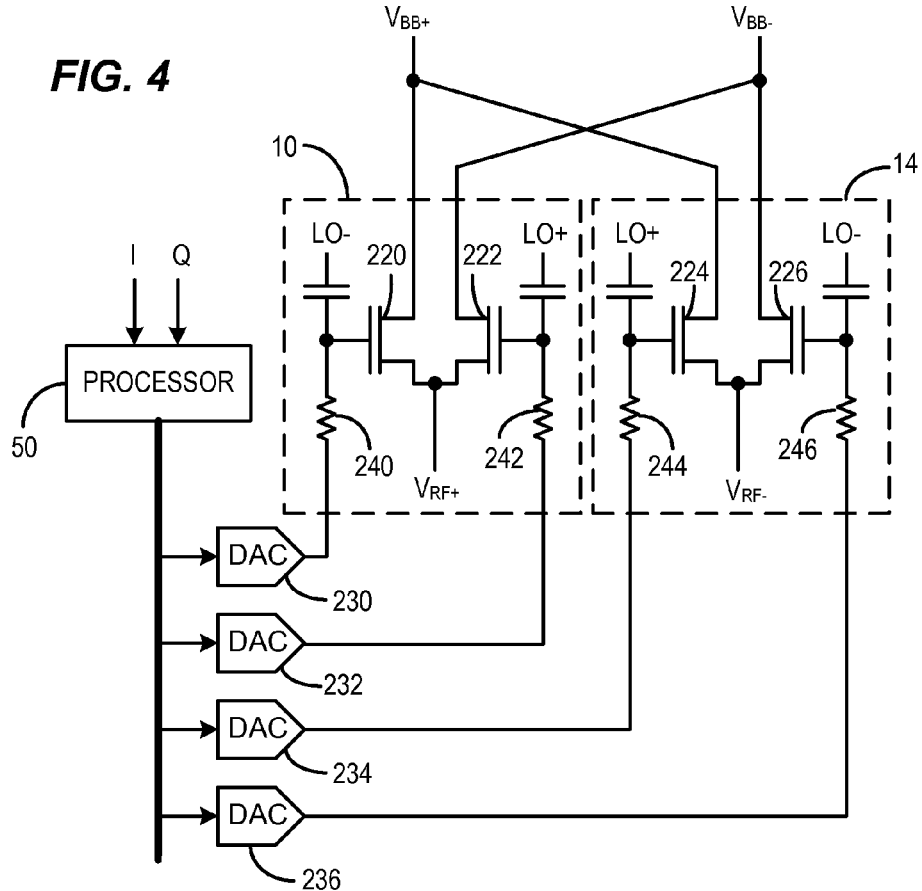

ially to reduce the amount of 2nd order distortion in the received communication signal.

ESTIMATION AND REDUCTION OF SECOND ORDER DISTORTION IN REAL TIME

CROSS-REFERENCE TO RELATED APPLICATIONS

This application is related to co-pending U.S. patent applications: application Ser. No. 13/832,432; application Ser. No. 13/832,253; and application Ser. No. 13/832,649, each filed on even date herewith, which are incorporated herein in their entireties.

BACKGROUND

In a two way transceiver (transmitter/receiver) device such as a cellular telephone, signals from the transmitter can enter the receiver creating second order products that behave like noise to the receiver. This can undesirably degrade the signal-to-noise ratio of the receiver.

BRIEF DESCRIPTION OF THE DRAWINGS

Example embodiments of the present disclosure will be described below with reference to the included drawings such that like reference numerals refer to like elements and in which:

FIG. 3 is a block diagram of an example circuit arrangement in which processor 50 adjusts a filter parameter.

FIG. 4 is a diagram of an example circuit arrangement in which processor 50 adjusts a gate bias in one or more of the mixer circuits.

DETAILED DESCRIPTION

Figure 1:
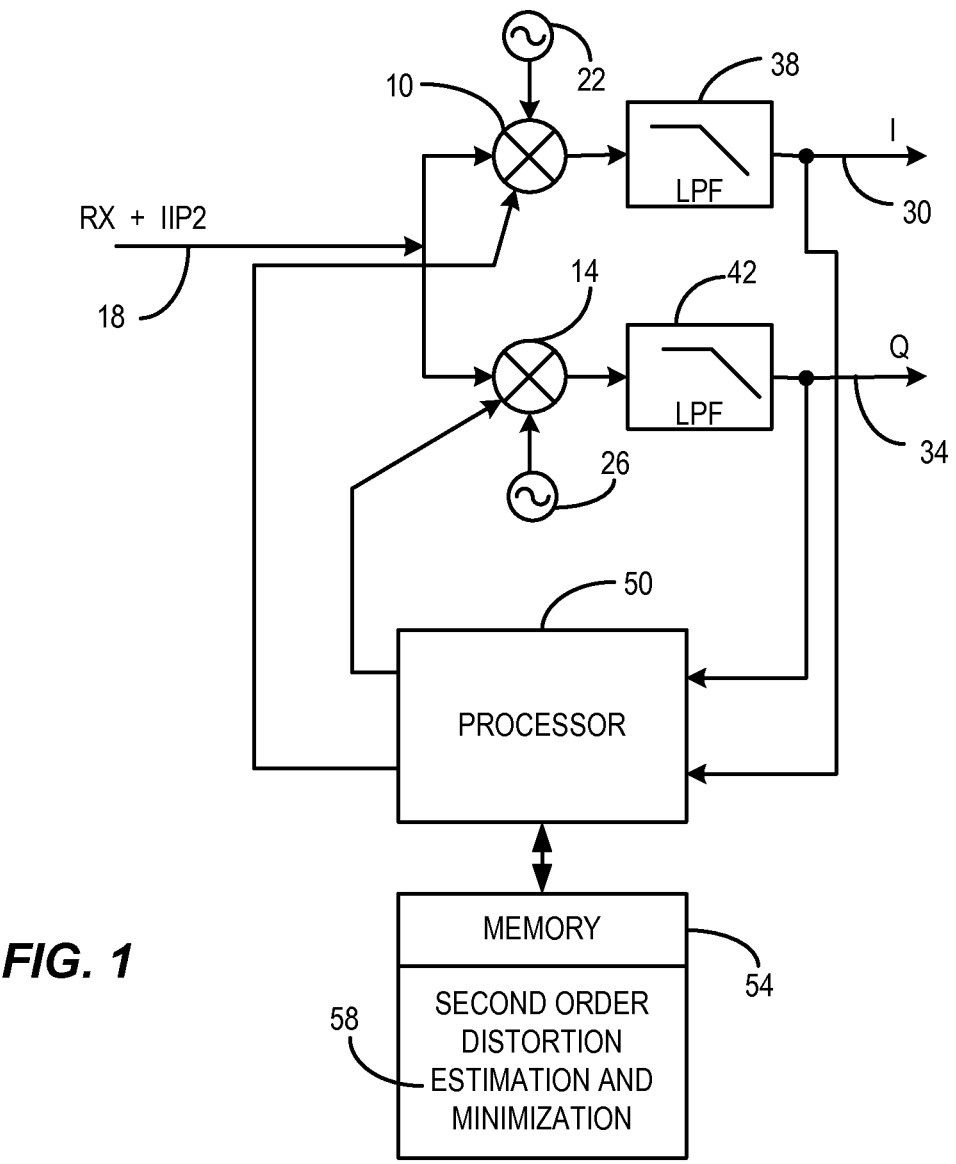
FIG. 1 is an example block diagram of a portion of a transceiver device 100 in accordance with aspects of the present disclosure.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The invention is not to be considered as limited to the scope of the embodiments described herein.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or "application" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "Computer" and the like as used herein encompasses both hard programmed, special purpose, general purpose and programmable devices and may encompass a plurality of such devices or a single device in either a distributed or centralized configuration without limitation.

Reference throughout this document to "one embodiment", "certain embodiments", "an embodiment", "an example", "an implementation", "certain examples" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In radio systems such as the cellular 3G and 4G LTE radio systems or other wireless communication systems, a transceiver (e.g., a mobile device such as a cellular telephone) transmits power that can leak back into the transceiver's own receiver (i.e. through the receiver path). This causes problems for the receiver since this power often falls directly within the receiver frequency due to "2nd order" non-linearity production of second order distortion components (also referred to as "IIP2"). This can be especially problematic in modern radio receiver architectures.

Because of this second order distortion, the signal that the transceiver's receiver receives is equal to the desired incoming signal (RX—what the device is supposed to receive) plus some proportion of the transmit signal squared (ignoring noise and other factors). This can be represented mathematically as:

$$\text{Receiver input signal} = RX + c^*(TX)^2,$$

where RX represents the desired signal to be received, and 'c' is a constant of proportionality of the $(TX)^2$ signal. Ideally, c=0 and the receiver only receives signal RX. The signal due to $(TX)^2$ is effectively just noise that corrupts the signal RX that the receiver is trying to receive.

Note that the signal RX may be considered complex, i.e., can be written as I+jQ, where $j=\sqrt{-1}$, that is, "I" is the real part, and "Q" is the imaginary part.

The second order distortion/interference signals IIP2 can be measured without the presence of the desired receive signal in the factory or during power up of the transceiver (e.g., telephone). However, this method does not allow one to correct the operation of the radio in real time using communication signals as it is working within a wireless network. Since various factors such as age, temperature, surroundings, etc. can cause variations in the amount of IIP2 distortion signals that are introduced in the receive path, initial factory settings may not be optimal.

In order to be able to more fully address the problem of second order interference, in accord with the present teachings the transceiver can examine a received communication signal in real time while the transceiver is actually receiving the RX communication signal. By doing this the amount of 2nd order signal can be estimated. Once the second order signal is estimated, adjustments can be made to the operational parameters of the receiver (e.g., filter bandwidth, filter Q, mixer bias levels, etc.) to reduce the 2nd order distortion signal components, e.g., using an iterative process.

Therefore, in accord with certain embodiments, in a radio receiver, a method of reducing second order distortion components involves: at a first mixer, mixing an input signal with an oscillator signal to generate an I component of a received radio communication signal; at a second mixer, mixing the input signal with a phase shifted oscillator signal to generate a Q component of the received radio communication signal; computing an estimate of second order distortion as a function of the I and Q components of the received radio communication signal; and adjusting an operational parameter of the radio receiver to reduce the estimated value of second order distortion components.

In certain implementations, the estimate of second order distortion is computed as $<I^2>-<Q^2>$. In certain implementations, the estimate of second order distortion is computed as $<IQ>$. In certain implementations, the operational parameter of the radio receiver can include an operational parameter of one or both of the first and second mixers. In certain implementations, the operational parameter of the radio receiver includes bias levels of one or both of the first and second mixers. In certain implementations, the bias level comprises a gate bias voltage of one or both of the first and second mixers. In certain implementations, the operational parameter of the radio receiver includes an operational parameter of a filter. In certain implementations, the operational parameter of the filter comprises a filter Q or bandwidth.

A radio receiver consistent with the present teachings has a local oscillator and a first mixer, configured to mix an input signal with a local oscillator signal from the local oscillator to generate an I component of a received radio communication signal. A second mixer is configured to mix the input signal with a phase shifted local oscillator signal to generate a Q component of the received radio communication signal. A processor is programmed to: compute an estimate of second order distortion as a function of the I and Q components of the received radio communication signal; and adjust an operational parameter of the radio receiver to reduce the estimate of second order distortion components. In certain implementations, in being programmed to compute an estimate of second order distortion the processor is programmed to compute $<I^2>-<Q^2>$. In certain implementations, in being programmed to compute an estimate of second order distortion the processor is programmed to compute $<IQ>$. In certain implementations, the operational parameter of the radio receiver comprises an operational parameter of one or both of the first and second mixers. In certain implementations, the operational parameter of the radio receiver comprises bias levels of one or both of the first and second mixers. In certain implementations, the bias level comprises a gate bias voltage of one or both of the first and second mixers. In certain implementations, the radio receiver has one or more digital to analog converters coupled to the processor and configured to convert digital control signals from the processor to a voltage that sets a bias level of one or both of the first and second mixers. In certain implementations, the radio receiver has one or more digital to analog converters coupled to the processor and configured to convert digital control signals from the processor to a voltage that sets a gate bias of one or both of the first and second mixers. In certain implementations, the operational parameter of the radio receiver comprises an operational parameter of a filter. In certain implementations, the operational parameter of the filter comprises a filter Q or bandwidth.

With reference to FIG. 1, in certain embodiments, a method is provided for tuning the IIP2 of a radio receiver. In the embodiment discussed herein, the radio receiver has a pair of mixers 10 and 14 that produce outputs by mixing their input signal 18 with local oscillator signals 22 and 26 (which are 90 degrees out of phase) in order to produce I and Q output signals 30 and 34 coming from the pair of mixers. These I and Q output signals 30 and 34 respectively are mixed by mixers 10 and 14 down to baseband in a single conversion and are the signals that are decoded after filtering at low pass filters 38 and 42. While this discussion presumes a single conversion radio receiver, the present techniques are equally applicable to multiple conversion receivers.

In accord with certain implementations, the mixers 10 and 14 may have controllable parameters that can be adjusted directly or indirectly by a processor 50. Such controllable parameters can have an effect on the amount of 2nd order distortion produced at the output of the mixers and hence at the output of the filters. Processor 50 operates based on instructions stored in a memory 54 that includes instructions 58 that estimate the second order distortion and control the transceiver in a manner that helps to minimize such second order distortion components. Hence, a method can be provided to estimate/measure the second order distortion signal in the presence of a wanted signal during operation of the transceiver in the field. By taking this measurement, the second order terms can be minimized using a closed loop approach.

In the example transceiver of FIG. 1, the I signal 30 and the Q signal 34 are processed in the radio transceiver in order to carry out reception of a transmitted communication. Interference is superimposed on these signals, and in the current example, second order components are one type of interference signal that can be superimposed on the wanted signal thus reducing the SNR (signal to noise ratio). It should be noted that second order distortion can be very significant in today's transceivers that use an architecture called "direct conversion", "single conversion" or "zero-IF". If the second order interference is labelled as 'TX', the desired 'RX' signal has I and Q signal components at 30 and 34 that become:

$$I \rightarrow I+a(TX)^2$$

$$Q \rightarrow Q+b(TX)^2$$

where a and b are coefficients that indicate the amount of second order distortion (for purposes of this analysis, the second order distortion is primarily in the form of power resulting from receipt of transmitted signal TX from the transmitter portion of the transceiver and other forms of noise and interference are presumed negligible). If there is no second order distortion, a=0 and b=0.

Therefore the average power of the I and Q signals become:

$$\text{Average Power } I \rightarrow <I^2>+a<TX^2>$$

$$\text{Average Power } Q \rightarrow <Q^2>+b<TX^2>$$

where the symbols < > denote averages over time.

The cross correlation of I and Q becomes:

$$\text{power } IQ \rightarrow ab<TX^2*TX^2> \qquad \text{EQUATION 1}$$

In an ideal radio $<I^2>=<Q^2>$, therefore taking the difference of $<I^2>-<Q^2>$ should yield a measurement in which the received signal RX is taken out leaving only an estimated measurement of the second order distortion components. Thus:

$$\text{Power } I \text{ minus Power } Q \rightarrow (a-b)<TX^2> \qquad \text{EQUATION 2}$$

By using EQUATION 1 or EQUATION 2 one obtains a direct estimate/measurement of the intermodulation with the desired RX signal been removed. Hence, these equations can be used as estimates for the second order distortion components.

By use of this information, a closed loop system can be devised that minimizes ab using EQUATION 1 or (a−b) using EQUATION 2 or both to estimate the second order distortion. Hence, referring back to FIG. 1, instructions 58 are used by processor 50 to sample the I and Q signals (converted to the digital domain and fed back to processor 50) and compute an estimate of the second order distortion. The processor 50 can then increment a suitable transceiver parameter to see how the incrementing of the transceiver parameter affects the second order distortion. The process can then be iterated so as to minimize the second order distortion. In one example, a parameter of the mixers 10 and 14, such as the mixer gate bias, can be adjusted and the measurement and estimation of the second order distortion repeated to determine if it has improved or degraded. This process can be repeated until, for example, an optimum amount of mixer bias is achieved for one or both mixers or any of the mixer components.

It is noted, however, that multiple effects may be caused by such an adjustment in an attempt to optimize IIP2 distortion. For example, if the mixer bias is changed, current drain can increase. So, if the IIP2 distortion is within acceptable bounds, it may be unnecessary to fully optimize the mixer properties to achieve the absolute best IIP2 distortion performance, provided that the IIP2 distortion performance can be improved to be within acceptable limits. In all cases, what is optimum may have to be determined by the process or using a suitable algorithm which may optimize more than simply the IIP2 distortion performance. In this example, once IIP2 performance is improved to an adequate degree, if current drain is increasing it may be advantageous to not fully optimize the IIP2 distortion in favour of having adequate IIP2 distortion performance and lower current drain (to maintain long battery life).

It is noted that in FIG. 1, analog to digital and digital to analog conversions are omitted to simplify the figure, but those skilled in the art will understand that the I and Q signals are converted to digital for processing by processor 50 and the control signals that modify a transceiver parameter may be analog or digital, and hence, may be converted to analog when appropriate.

Hence, in accord with an implementation of the above discussion, the I output is squared and averaged to produce $<I^2>$. In a similar manner, the Q output is squared and averaged to produce $<Q^2>$. The differences between the $<I^2>$ and $<Q^2>$ provides a value that is minimized or reduced by the mixer input(s) that control the amount of 2nd order distortion produced. In other implementations, other transceiver parameters (e.g., filter properties) may be adjusted to achieve a reduction in the IIP2 distortion components. In another implementation, $<IQ>$ may be computed and minimized or reduced by the mixer input(s) that control the amount of 2nd order distortion produced. In other implementations, other transceiver parameters (e.g., filter properties) may be adjusted to achieve a reduction in the IIP2 distortion components.

Figure 2:
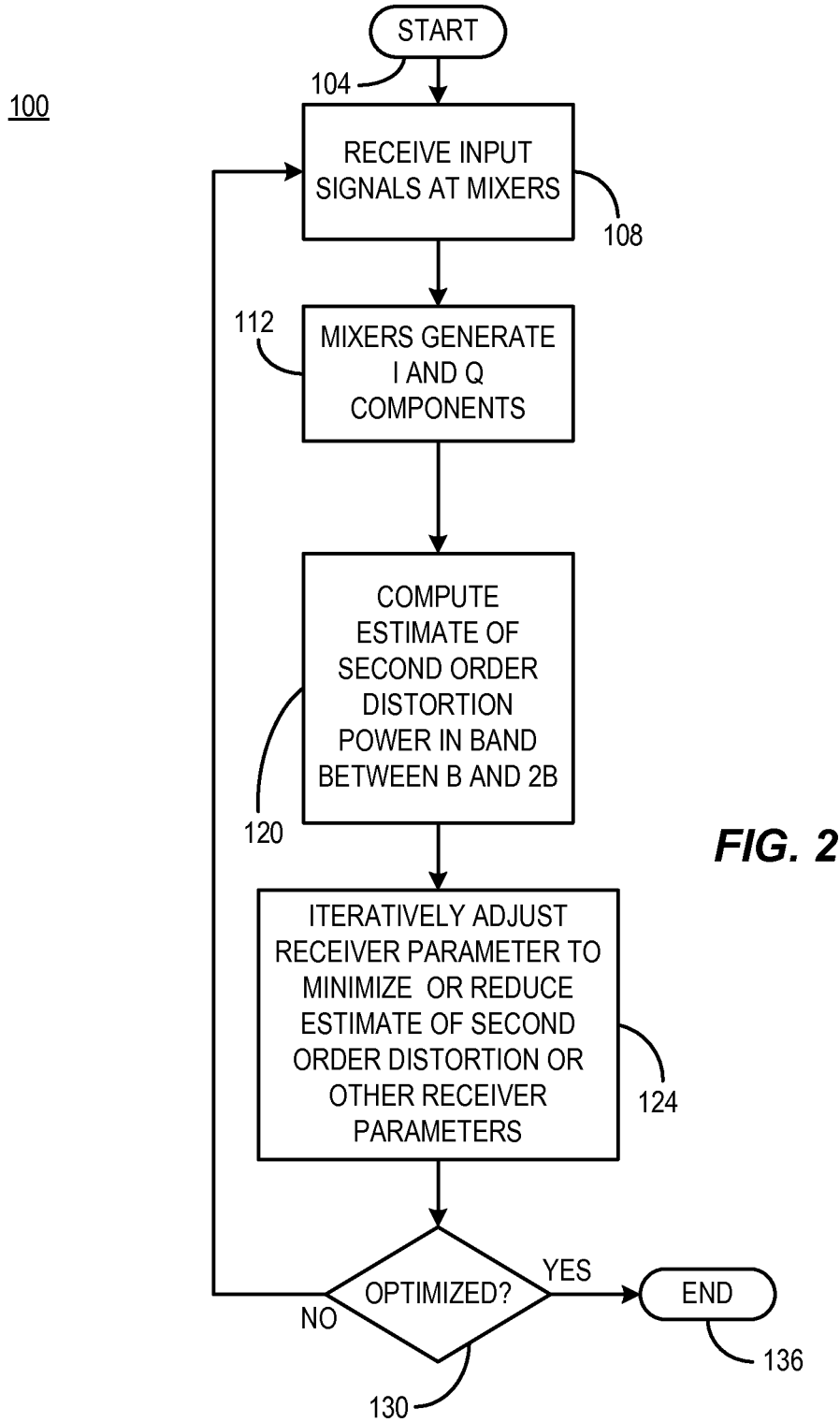
FIG. 2 is an example flow chart block of a process consistent with certain aspects of the present disclosure.

One example process for carrying out the optimization of the second order distortion components is depicted as process 100 of FIG. 2 starting at 104 after a decision is made to optimize the IIP2 performance of the transceiver. Such a decision can be based upon any number of criteria, such as for example: passage of a specified time period, change in SNR, observed degradation of radio performance according to any specified criterion, power up of the radio, receipt of a signal of a designated type, etc.

Once the process 100 is initiated at 104, input signals are received at the receiver's mixers at 108 and converted to I and Q components by mixing with local oscillator signals that are separated in phase by 90 degrees at 112 in a normal fashion. The I and Q values are then sampled by the processor 50 to compute an estimate of the second order distortion components at 120, for example over a suitable time period (e.g., every ten microseconds). In one example, at 120, processor 50 computes $<I^2>-<Q^2>$ over a similar period which equals $(a-b)<TX^2>$+noise. Alternatively, the processor can compute $<IQ>$ which equals $ab<TX^4>$+noise. Under the condition that the noise is significantly less than IIP2, this is a good approximation of the IIP2 components. Thus at 124, the process can be iterated to adjust a receiver parameter such as the mixer bias to minimize or reduce either:

$$<I^2>-<Q^2>\approx(a-b)<TX^2> \quad\quad \text{EQUATION 3}$$

or, $$<IQ>\approx ab<TX^4>, \quad\quad \text{EQUATION 4}$$

either of which is a suitable estimate for IIP2 for purposes of this optimization process.

In this manner, the IIP2 components can be minimized or alternatively reduced to an acceptable level while optimizing other receiver performance parameters. When the optimization is in progress the measuring and adjusting as described above are iterated until the processor 50 deems the system optimized. This is depicted as a "no" decision at 130 at which point control returns to 104. At the point where the processor 50 deems the system to be suitably optimized in terms of IIP2 alone or in conjunction with one or more other performance parameters, control passes to block 136 and the process ends until invoked again.

Referring now to FIG. 3, in certain implementations processor 50 can be configured to receive the I and Q signals as depicted in FIG. 1 and provide an output control signal to one or more digital to analog converters (DAC) 202 to control an operational parameter of a filter such as filter 206. Of course, this example presumes a filter 206 that is adjusted with analog signals. For control using digital signals, the DAC 202 is not used. In this example, the filter parameters being controlled relate to an output from a low noise amplifier 210 coupled to an antenna to receive the RX input signal. Filter 206 can be configured as a band pass filter or a notch filter or any other suitable filter configuration. The control exercised by processor 50 can be to control the bandwidth, center frequency, notch frequency, Q or other filter parameter as may be deemed in a particular radio configuration to impact the second order distortion components that appear in the receiver.

Referring now to FIG. 4, in certain implementations processor 50 can be configured to receive the I and Q signals as depicted in FIG. 1 and provide an output control signal to one or more of the mixers 10 and 14, shown in greater detail in this illustration. In this example the mixers are configured to operate on differential signals and hence mixer 10 receives signals LO− and LO+ from the local oscillator. Similarly, mixer 14 receives differential signals LO− and LO+ from its local oscillator source (which may be the same local oscillator with multiple phase outputs) with the mixer 10 receiving local oscillator signals that are 90 degrees out of phase with those received by mixer 14. Each local oscillator signal is shown capacitively coupled to the respective gates of transistors 220, 222 of mixer 10, and 224, 226 of mixer 14.

Processor 50 sends control signals to DACs 230, 232, 234 and 236 to control an operational parameter the mixer transistors 220, 222, 224 and 226 respectively. In this example, the gate bias is controlled by the output of DACs 230, 232, 234 and 236 through resistors 240, 242, 244 and 246 respectively by changing the analog voltage applied to the respective resistors. The sources of transistors 220, 222, 224 and 226 are coupled to differential supply voltages VBB− and VBB+ while the drains of transistors 220, 222 are coupled together and receive the RF input voltage in a differential manner so that VRF+ is received by mixer 10 and VRF− is received at the drains of transistors 224 and 226 which are also coupled together.

In this example, the bias of each of the transistor pair making up mixer 10 and the transistor pair making up mixer 14 can be individually controlled to optimize the operation of the mixer and reduce or minimize the second order distortion components as previously described. One or more gate bias can be adjusted to achieve the desired change in operation of the mixers. In other implementations, other parameters of the mixers could be adjusted such as the signal level from the oscillator or the RF input level to the receiver. Other variations will occur to those skilled in the art upon consideration of the present teachings.

The order in which the optional operations represented in process 100 occur is not predetermined or predefined, and these operations may occur in any operational order. Thus, while the blocks comprising the methods are shown as occurring in a particular order, it will be appreciated by those skilled in the art that many of the blocks may be interchangeable and can occur in different orders than that shown without materially affecting the end results of the methods.

The implementations of the present disclosure described above are intended to be examples only. Those of skill in the art can effect alterations, modifications and variations to the particular example embodiments herein without departing from the intended scope of the present disclosure. Moreover, selected features from one or more of the above-described example embodiments can be combined to create alternative example embodiments not explicitly described herein.

It will be appreciated that any module or component disclosed herein that executes instructions may include or otherwise have access to non-transitory and tangible computer readable media such as storage media, computer storage media, or data storage devices (removable or non-removable) such as, for example, magnetic disks, optical disks, or tape data storage, where the term "non-transitory" is intended only to exclude propagating waves and signals and does not exclude volatile memory or memory that can be rewritten. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. In a radio receiver, a method of reducing second order distortion components, comprising:
   receiving a radio communication signal as an input signal at the radio receiver;
   at a first mixer, mixing the input signal with an oscillator signal to generate an I component of the received radio communication signal;
   at a second mixer, mixing the input signal with a phase shifted oscillator signal to generate a Q component of the received radio communication signal;
   computing, while receiving the radio communication signal and mixing the input signal with an oscillator signal and mixing the input signal with a phase shifted oscillator signal, an estimate of second order distortion as a function of only the I and Q components of the received radio communication signal produced by the first and second mixers; and
   adjusting, while receiving the radio communication signal and mixing the input signal with an oscillator signal and mixing the input signal with a phase shifted oscillator signal, an operational parameter of the radio receiver to reduce the estimated value of second order distortion components.

2. The method in accordance with claim 1, where the estimate of second order distortion is computed as $\langle I^2 \rangle - \langle Q^2 \rangle$, where I and Q are outputs of the first and second mixers operating on the received radio communication signal.

3. The method in accordance with claim 1, where the estimate of second order distortion is computed as $\langle IQ \rangle$, where I and Q are outputs of the first and second mixers operating on the received radio communication signal.

4. The method in accordance with claim 1, where the operational parameter of the radio receiver comprises an operational parameter of one or both of the first and second mixers.

5. The method in accordance with claim 1, where the operational parameter of the radio receiver comprises bias levels of one or both of the first and second mixers.

6. The method in accordance with claim 1, where the operational parameter of the radio receiver comprises an operational parameter of a filter.

7. The method in accordance with claim 6, where the operational parameter of the filter comprises a filter Q or bandwidth.

8. The method in accordance with claim 1, wherein adjusting the operational parameter of the radio receiver is based on a determination that the estimate of the second order distortion is not within acceptable limits and a determination that adjusting the operational parameter is not increasing current drain.

9. A radio receiver, comprising:
   a local oscillator;
   a first mixer, configured to mix an input signal with a local oscillator signal from the local oscillator to generate an I component of a received radio communication signal, the input signal comprising a radio communications signal received by the radio receiver;

a second mixer, configured to mix the input signal with a phase shifted local oscillator signal to generate a Q component of the received radio communication signal;

a processor programmed to:

compute, while the first mixer mixes the input signal with an oscillator signal and the second mixer mixes the input signal with a phase shifted oscillator signal, an estimate of second order distortion as a function of only the I and Q components of the received radio communication signal; and adjust, while the first mixer mixes the input signal with an oscillator signal and the second mixer mixes the input signal with a phase shifted oscillator signal, an operational parameter of the radio receiver to reduce the estimate of second order distortion components.

10. The radio receiver in accordance with claim 9, where in being programmed to compute the estimate of second order distortion the processor is programmed to compute $<I^2>-<Q^2>$, where I and Q are outputs of the first and second mixers operating on the received radio communication signal.

11. The radio receiver in accordance with claim 9, where in being programmed to compute the estimate of second order distortion the processor is programmed to compute $<IQ>$, where I and Q are outputs of the first and second mixers operating on the received radio communication signal.

12. The radio receiver in accordance with claim 9, where the operational parameter of the radio receiver comprises an operational parameter of one or both of the first and second mixers, where I and Q are outputs of the first and second mixers on a received communication signal.

13. The radio receiver in accordance with claim 9, where the operational parameter of the radio receiver comprises bias levels of one or both of the first and second mixers.

14. The radio receiver in accordance with claim 13, where the bias level comprises a gate bias or a bulk bias voltage of one or both of the first and second mixers.

15. The radio receiver in accordance with claim 13, further comprising one or more digital to analog converters coupled to the processor and configured to convert digital control signals from the processor to a voltage that sets a bias level of one or both of the first and second mixers.

16. The radio receiver in accordance with claim 13, further comprising one or more digital to analog converters coupled to the processor and configured to convert digital control signals from the processor to a voltage that sets a gate bias of one or both of the first and second mixers.

17. The radio receiver in accordance with claim 9, where the operational parameter of the radio receiver comprises an operational parameter of a filter.

18. The radio receiver in accordance with claim 17, where the operational parameter of the filter comprises a filter Q or bandwidth.

19. A radio receiver, comprising:

a local oscillator;

a first mixer, configured to mix an input signal with a local oscillator signal from the local oscillator to generate an I component of a received radio communication signal, the input signal comprising a radio communications signal received by the radio receiver;

a second mixer, configured to mix the input signal with a phase shifted local oscillator signal to generate a Q component of the received radio communication signal;

a programmed processor;

one or more digital to analog converters coupled to the processor and configured to convert digital control signals from the processor a voltage that sets a bias level of one or both of the first and second mixers;

where the processor is programmed to:

compute, while the first mixer mixes the input signal with an oscillator signal and the second mixer mixes the input signal with a phase shifted oscillator signal, an estimate of second order distortion as a function of only the I and Q components of the received radio communication signal as either $<I^2>-<Q^2>$ or $<IQ>$; and adjust, while the first mixer mixes the input signal with an oscillator signal and the second mixer mixes the input signal with a phase shifted oscillator signal, an operational parameter of the radio receiver to reduce the estimate of second order distortion components.

20. The radio receiver in accordance with claim 19, where the bias level comprises a gate bias or a bulk bias.

* * * * *